United States Patent
Klonowski et al.

(10) Patent No.: US 11,264,854 B2
(45) Date of Patent: Mar. 1, 2022

(54) ELECTRIC MACHINE WITH PHASE CHANGE MATERIAL FOR A TURBOMACHINE STARTER/GENERATOR

(71) Applicant: SAFRAN HELICOPTER ENGINES, Bordes (FR)

(72) Inventors: Thomas Klonowski, Moissy-Cramayel (FR); Camel Serghine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 202 days.

(21) Appl. No.: 16/610,144

(22) PCT Filed: May 3, 2018

(86) PCT No.: PCT/FR2018/000108
§ 371 (c)(1),
(2) Date: Nov. 1, 2019

(87) PCT Pub. No.: WO2018/202963
PCT Pub. Date: Nov. 8, 2018

(65) Prior Publication Data
US 2020/0076262 A1    Mar. 5, 2020

(30) Foreign Application Priority Data
May 3, 2017    (FR) .......................... 1753877

(51) Int. Cl.
*H02K 3/24* (2006.01)
*H02K 1/32* (2006.01)
(Continued)

(52) U.S. Cl.
CPC ................. *H02K 3/24* (2013.01); *H02K 1/32* (2013.01); *H02K 3/22* (2013.01); *H02K 3/28* (2013.01); *H02K 9/20* (2013.01)

(58) Field of Classification Search
CPC .. H02K 3/24; H02K 1/32; H02K 3/22; H02K 3/28; H02K 9/20; H02K 9/22; H02K 9/225
(Continued)

(56) References Cited

U.S. PATENT DOCUMENTS

| 3,801,843 A | 4/1974 | Corman et al. |
| 6,577,038 B2 * | 6/2003 | Butman .................. H02K 3/22 310/201 |
| 2016/0043613 A1 | 2/2016 | Patel et al. |

FOREIGN PATENT DOCUMENTS

| CN | 102185422 | * | 9/2011 |
| CN | 104782029 | * | 7/2015 |

(Continued)

OTHER PUBLICATIONS

International Search Report dated Sep. 4, 2018 in PCT/FR2018/000108 filed on May 3, 2018.
(Continued)

*Primary Examiner* — Ahmed Elnakib
(74) *Attorney, Agent, or Firm* — Oblon, McClelland, Maier & Neustadt, L.L.P.

(57) ABSTRACT

An electric machine includes a stator and a rotor configured to be driven in rotation in relation to one another. The rotor includes a plurality of permanent magnets, and the stator further includes a magnetic circuit including poles extending toward the rotor. The machine includes windings of conducting elements around each pole and at least one heat sink arranged inside a conducting element and/or between the conducting elements. The heat sink includes a phase change material.

13 Claims, 4 Drawing Sheets

(51) Int. Cl.
    *H02K 3/22*     (2006.01)
    *H02K 3/28*     (2006.01)
    *H02K 9/20*     (2006.01)

(58) Field of Classification Search
    USPC .......................................................... 310/52
    See application file for complete search history.

(56)                References Cited

FOREIGN PATENT DOCUMENTS

| DE | 2130 016      |   | 1/1972 |
|----|---------------|---|--------|
| EP | 2 985 885 A1  |   | 2/2016 |
| FR | 2 971 376 A1  |   | 8/2012 |
| FR | 2971376       | * | 8/2012 |
| FR | 3 012 698 A1  |   | 5/2015 |

OTHER PUBLICATIONS

French Preliminary Search Report dated Dec. 7, 2019, in Patent Application No. 1753877, 8 pages (with English Translation of Category of Cited Documents).

* cited by examiner

FIG. 3a
FIG. 3b
FIG. 3c
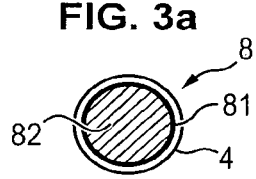
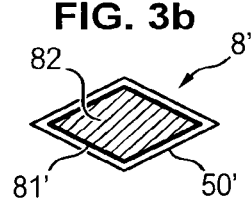
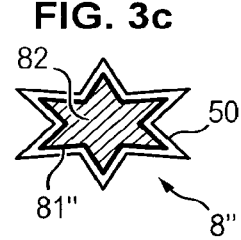
FIG. 4
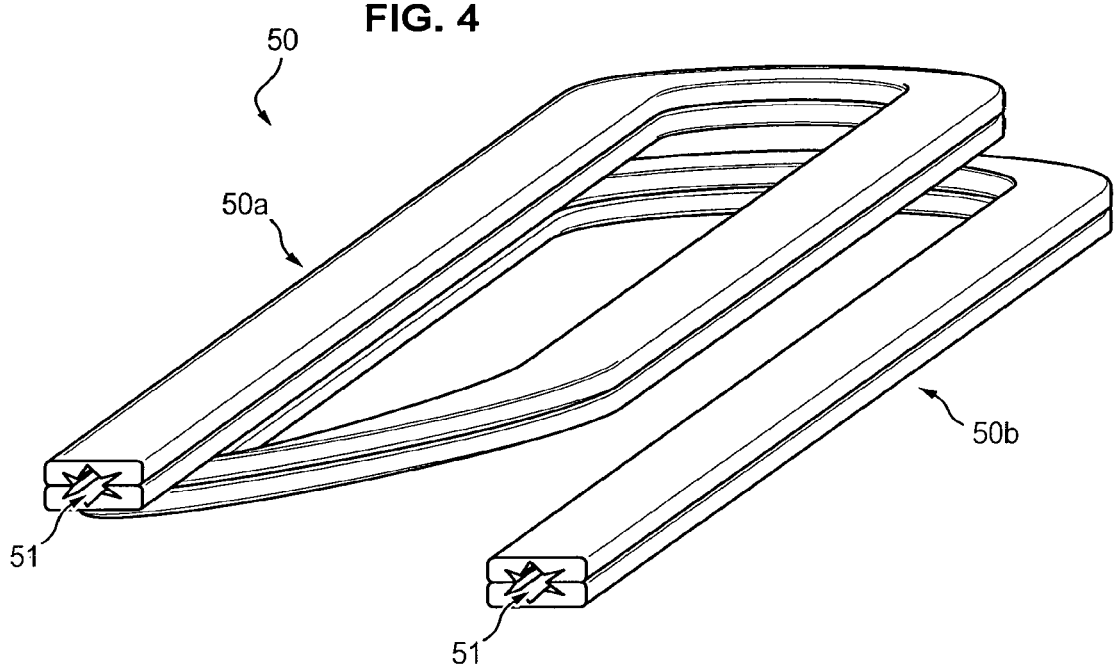
FIG. 5
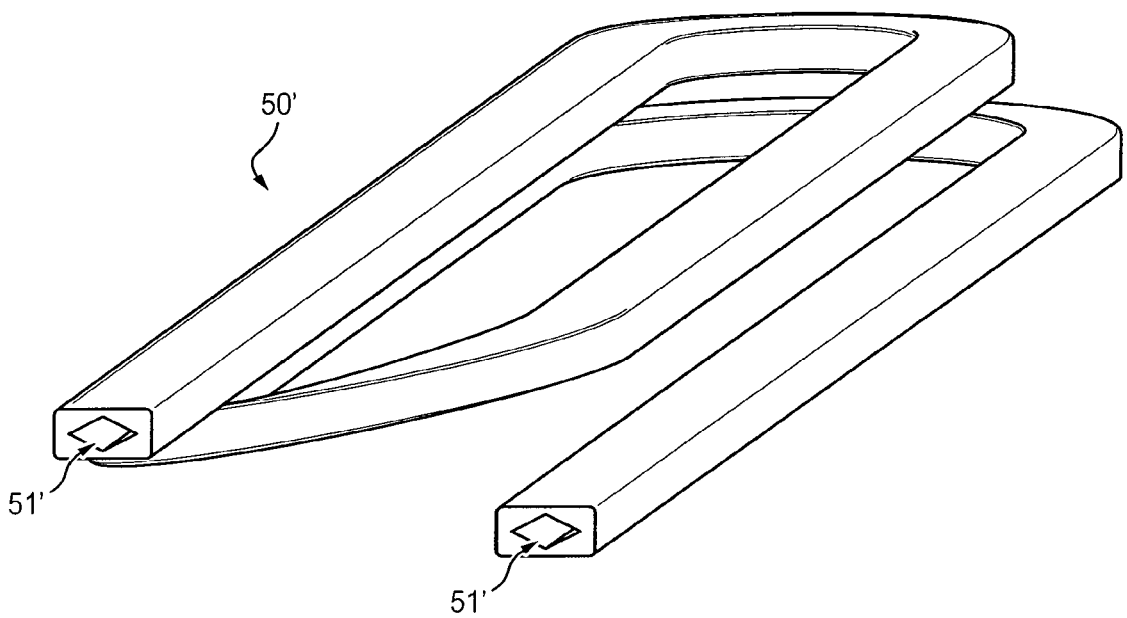

ELECTRIC MACHINE WITH PHASE CHANGE MATERIAL FOR A TURBOMACHINE STARTER/GENERATOR

GENERAL TECHNICAL FIELD

The invention relates to the aircraft engines, especially those of a helicopter. It relates particularly to the electric machines installed on the helicopter engines achieving the function of generating electrical energy and/or electrically motorizing some mechanical members. These electric machines may be starter-generators, starters, alternators or electric pumps which are either direct current or alternating current machines.

STATE OF THE ART

An engine of an aircraft comprises electric machines comprising a rotor (rotating part) and a stator (fixed part), the stator comprises a magnetic circuit and an electric circuit consisting of a set of windings composed of conductive wires.

In known manner, such electric machines have transient operating phases encountered mainly during sequences of start-up or acceleration of the aircraft engine or of some equipment that the aircraft engine comprises.

During these transient phases, the thus highly stressed electric machine dissipates an amount of heat that can be harmful to itself, which heat is mainly dissipated in the electric circuits and/or on the permanent magnets if comprised in the machine.

In a known manner, to promote the dissipation of heat and thus ensure the integrity of the electric machine, the elements that compose it are oversized, which penalizes its mass and its bulk.

Indeed, the structure and the dimensioning of an electric machine are guided by its thermal resistance and this is mainly a function of the amplitude of the electric currents it supports within these conductive windings (for example, an electric machine working under a mains voltage of 28 Vdc, under a power of several kW or kVA will give high-intensity electric currents that can reach several hundred amperes).

In order to optimize the thermal dissipation of the electric machine, several solutions are already known and used.

A first solution uses the natural convection with cooling by means of a finned heat sink at the periphery of the electric machine to have a large exchange surface with the surrounding environment. However, this solution is bulky and massive and often requires an air flow at the periphery of the machine.

A second solution uses the forced convection by the addition of a fan connected to the rotor shaft of the electric machine, whose air flow thus produced will exchange with the external and/or internal parts thereof. However, this solution is bulky and can generate additional sources of breakdowns.

A third alternative uses a forced cooling by injecting a liquid circulating in dedicated channels inside the electric machine or at the periphery (water, oil, fuel, etc.) and most often requires the presence of an additional exchanger to ensure the cooling of this liquid. However, this solution is also bulky, massive and intrusive, and requires relatively short maintenance steps (i.e. management of the sealing).

A fourth solution uses a cooling by means of thermoelectric module (Peltier effect). However, with this solution, the cooling is achieved only on localized areas and also requires a stabilized power supply allowing the thermoelectric power supply.

Thus, in an aeronautical application, that is to say within the context of an on-board system requiring high constraints in terms of compactness, mass and reliability, the existing solutions are not satisfactory.

PRESENTATION OF THE INVENTION

The invention makes it possible to reduce the mass and the size of an electric machine of an aircraft engine and makes it possible to improve these electromagnetic performances.

For this purpose, the invention proposes an electric machine comprising a stator and a rotor configured to be driven in rotation relative to each other, the rotor comprising a plurality of permanent magnets, the stator further comprising a magnetic circuit comprising poles extending towards the rotor, the machine comprising windings of conductive elements around each pole and at least one heat sink disposed inside a conductive element and/or between the conductive elements, the heat sink comprising a phase change material.

The invention is advantageously completed by the following characteristics, taken alone or in any one of their technically possible combinations.

A heat sink is disposed between conductive elements, said heat sink having a substantially cylindrical shape, and said heat sink extending along said conductive elements.

The winding is a set of hollow cylindrical wires.

The winding is a hollow bar winding.

The winding is formed in one piece and preferably obtained according to an additive manufacturing method.

The phase change material is in the form of salts or in the form of organic or eutectic compounds having solid-liquid phase change temperatures, adapted according to the constraints of use of the electric machine, greater than about a hundred degrees Celsius, typically between 100° C. and 300° C.

The heat sink comprises, in addition to the phase change material, at least one element which is electrically conductive so as not to disturb the circulation of the magnetic field lines in said machine.

The phase change material is capable of changing physical state between the solid state and the liquid state in a given temperature range.

The phase change material is contained in a sealed metal shell, the shell being electrically conductive or not, and thermally conductive.

A heat sink is disposed inside a conductive element, the phase change material of said heat conductor being contained in a thermally conductive and electrically conductive sealed metal shell.

The invention further relates to a direct current or alternating current machine such as a starter-generator, an alternator, a pump comprising an electric machine according to the invention.

And the invention also relates to an aircraft engine, such as a helicopter, comprising a starter-generator according to the invention.

The use of phase change materials allows a cooling as close as possible to the heating elements. Indeed, by reaching its melting temperature, therefore by switching from the solid state to the liquid state, the phase-change material absorbs an amount of heat. Consequently, a thermal transfer will occur between the heating elements and the phase change material.

The invention makes it possible to reduce the overall mass of an aircraft engine by decreasing the mass of the electric machine. Particularly, the masses of the ferromagnetic constituents (used in the magnetic circuit of the machine) and of the copper (used for the winding of the electric circuit) inside the machine are reduced.

Indeed, by optimizing the thermal transfers as close as possible to the elements subjected to the highest temperature rises, it is possible to reduce the mass and the bulk of the electric machines.

In addition, there is no addition of additional systems (i.e. exchanger, fins, . . . ) penalizing the mass balance, the bulk and the reliability of the electric machine.

PRESENTATION OF THE FIGURES

Other features, objects and advantages of the invention will become apparent from the following description, which is purely illustrative and non-limiting, and which should be read with reference to the appended drawings wherein:

FIG. 3a, 3b, 3c illustrate sectional views of wires constituting the winding of an electric machine according to the invention;

FIGS. 4 and 5 illustrate a view of a hollow bar winding, according to two variants, of an electric machine according to the invention;

In all the figures, the similar elements bear identical references.

DETAILED DESCRIPTION OF THE INVENTION

In the following, the term "phase change material" means a material capable of changing physical state in a given temperature range and which will absorb a large amount of heat energy from its surrounding environment to switch from the solid to liquid state and which restores part of the heat energy when the material cools down while switching from the liquid state to the solid state. These phase change materials are salts which may be composed of nitrate or hydroxide. The change from solid to liquid phase of the material is made at a temperature exceeding one hundred degrees Celsius up to a temperature in the order of 300° C.

Figure 1:
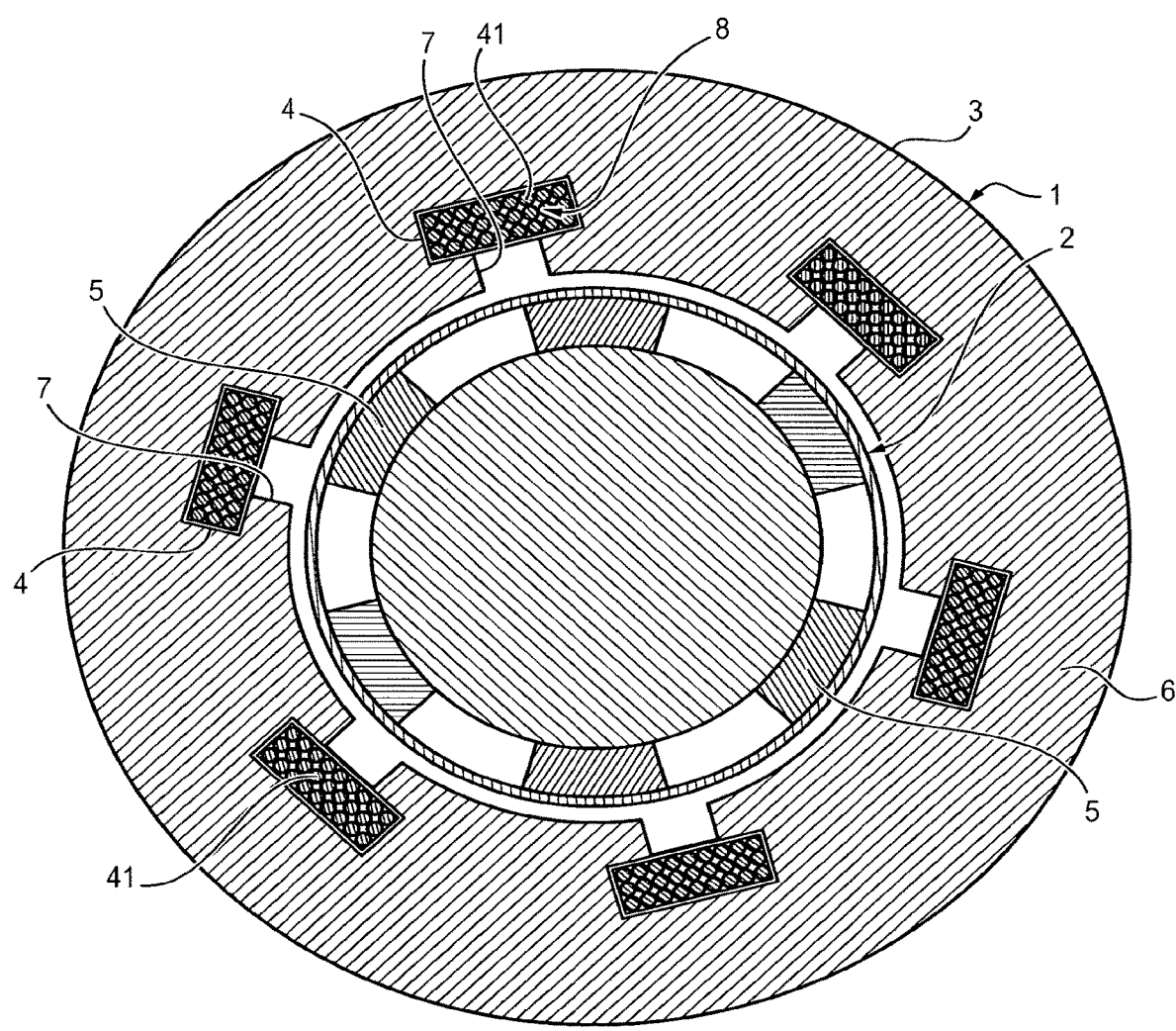
FIG. 1 illustrates a schematic sectional view of an electric machine according to one embodiment of the invention.

FIG. 1 illustrates an electric machine according to one embodiment of the invention. Such an electric machine is in particular used in an aircraft engine.

The electric machine of FIG. 1 is a permanent magnet machine and comprises a stator 1 and a rotor 2.

The stator 1 comprises a magnetic circuit 3. The magnetic circuit 3 comprises a peripheral portion 6 of generally cylindrical shape and poles 7 extending towards the rotor 2 and the stator 1 comprises an electric circuit 4 consisting of a winding of N conductive elements 41 around each pole 7 of the magnetic circuit 3. In this figure, the conductive elements 41 have a cylindrical section but other sections may be envisaged.

The rotor 2 carries permanent magnets 5. In FIG. 1, the electric machine comprises six permanent magnets 5 but a different number can be envisaged.

This type of electric machine topology makes it possible to operate either in generator mode (i.e., the rotor 2 rotates thanks to the application of an external mechanical torque and the variation of magnetic flux in the electric circuit 4 induces an electric current) or in engine mode (i.e., the power supply of the electric circuit 4 generates a magnetic flux through the magnetic circuit 3 and the interaction with the magnetic flux from the magnets 5 generates a rotation of the rotor 2 therefore a mechanical torque to the outside).

Figure 2A:
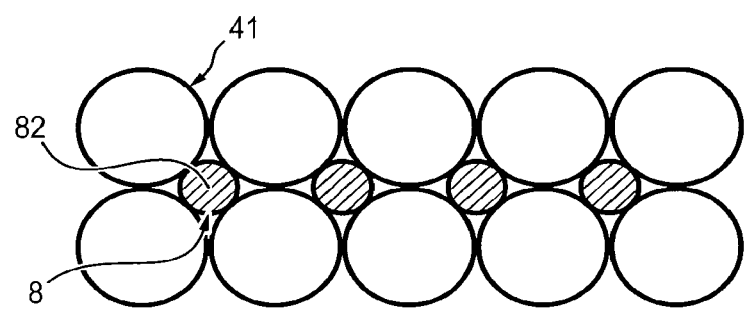
FIGS. 2a and 2b illustrate views of conductive elements of an electric machine according to the invention.
Figure 2B:
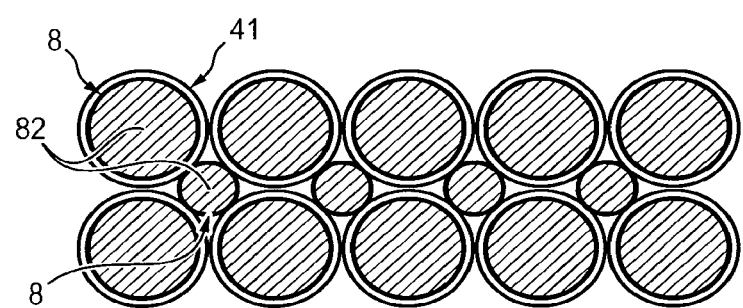

In order to promote the dissipation of the heat of the electric machine in particular during the transient phases presented above, there are provided hollow conductive elements for the winding and at least one heat sink 8 housed inside at least one conductive element and/or disposed between the conductive elements (see FIGS. 2a and 2b illustrating heat sinks between the conductive elements 41 with or without heat sink 8 inside the conductive elements).

In particular, in the example of FIG. 2a, cylindrically-shaped heat sinks 8 extend in the spaces arranged between conductive elements 41, which themselves have a shape of cylindrical wires. The heat sinks 8 extend along the conductive elements 41, along a direction of extension substantially parallel to those of the conductive elements.

As illustrated in FIGS. 3a, 3b, 3c, a heat sink 8, 8', 8" consists of a shell 81, 81', 81" containing a phase change material 82. The shell 81, 81', 81" is sealed to maintain and confine the material in the liquid state.

In a non-limiting manner, in FIG. 3a, the heat sink is cylindrical to fit conductive wires of the winding which is also cylindrical. Of course, other shapes are possible and depend on the shape of the conductive element: like a diamond in FIG. 3b, like a star in FIG. 3c.

Depending on the application, and more particularly within the context of the high-power electric motors for the more electrical applications for aircraft, the stator winding (i.e., of the stator: electric circuit) can be advantageously of topology called "bar winding"; that is to say the coils of cylindrical wires are replaced by massive, homogeneous and rigid winding in order to have a better filling rate of the notches (i.e., equal to the effective copper surface/total notch surface ratio) and therefore to have the possibility either of increasing electric power of the electric machine for the same mass, or of minimizing the copper mass for a constant power requirement.

The problem of heat dissipation is in this case much greater than with a winding consisting of N cylindrical wires, because when these bar windings are powered by alternating currents of relatively high frequencies beyond the kHz, Joule losses are increased by the "skin effect" (i.e., reduction of the apparent resistance of the conductor because the electric currents are more and more concentrated at the periphery during an increase in the power frequency).

FIG. 4 illustrates a bar winding 50 consisting of two solid conductors 50a, 50b plated together. The shape of the two conductors 50a, 50b is such that the two conductors 50a, 50b define a housing 51 allowing to house thereinside a heat sink (not represented). In this figure, the housing 51 has a "star" shape but may have another shape.

Advantageously, as illustrated in FIG. 5, the bar winding is formed in one piece and consists of one or several bars.

In addition, in this figure, the bar winding comprises a housing having a "diamond" shape.

Advantageously, the bar winding is formed in one piece or composed of a set of unit bars and is obtained by means of an additive manufacturing method (i.e. SLM "Selective Laser Melting" type or the like . . . ) which allows making complex shapes inside the winding, promoting the optimization of thermal transfers (i.e., exchange surface increased between the phase change materials and the conductor), the housing 51 therefore contains a heat sink and therefore allows limiting the rise in temperature and thus ensuring a high level of reliability (i.e., strength of the winding insulator in particular).

In the case where a heat sink is provided inside the conductive elements, the shell and the phase change material having to disturb as little as possible the circulation of the field lines in the magnetic circuit, the shell is itself metallic and is a good electrical conductor.

Still in this case, a phase change material being by definition an electrical insulator, the heat sink may comprise, in addition to the phase change material, conductive elements such as carbon nanotubes to also allow the free circulation of field lines in the magnetic circuit of the machine.

However, in the case where a heat sink is provided between the conductive elements, the shell is insulating so as not to contribute to the transmission of the electric currents.

The phase change material is in the form of salts or in the form of organic or eutectic compounds having solid-liquid phase change temperatures greater than about a hundred degrees Celsius, typically between 100° C. and 300° C. preferably. It may be, for example, nitrates or hydroxides ($LiNO_3$, $NaNO_3$, $Li_2CO_3$, . . . ), preferably with graphite.

Figure 6:
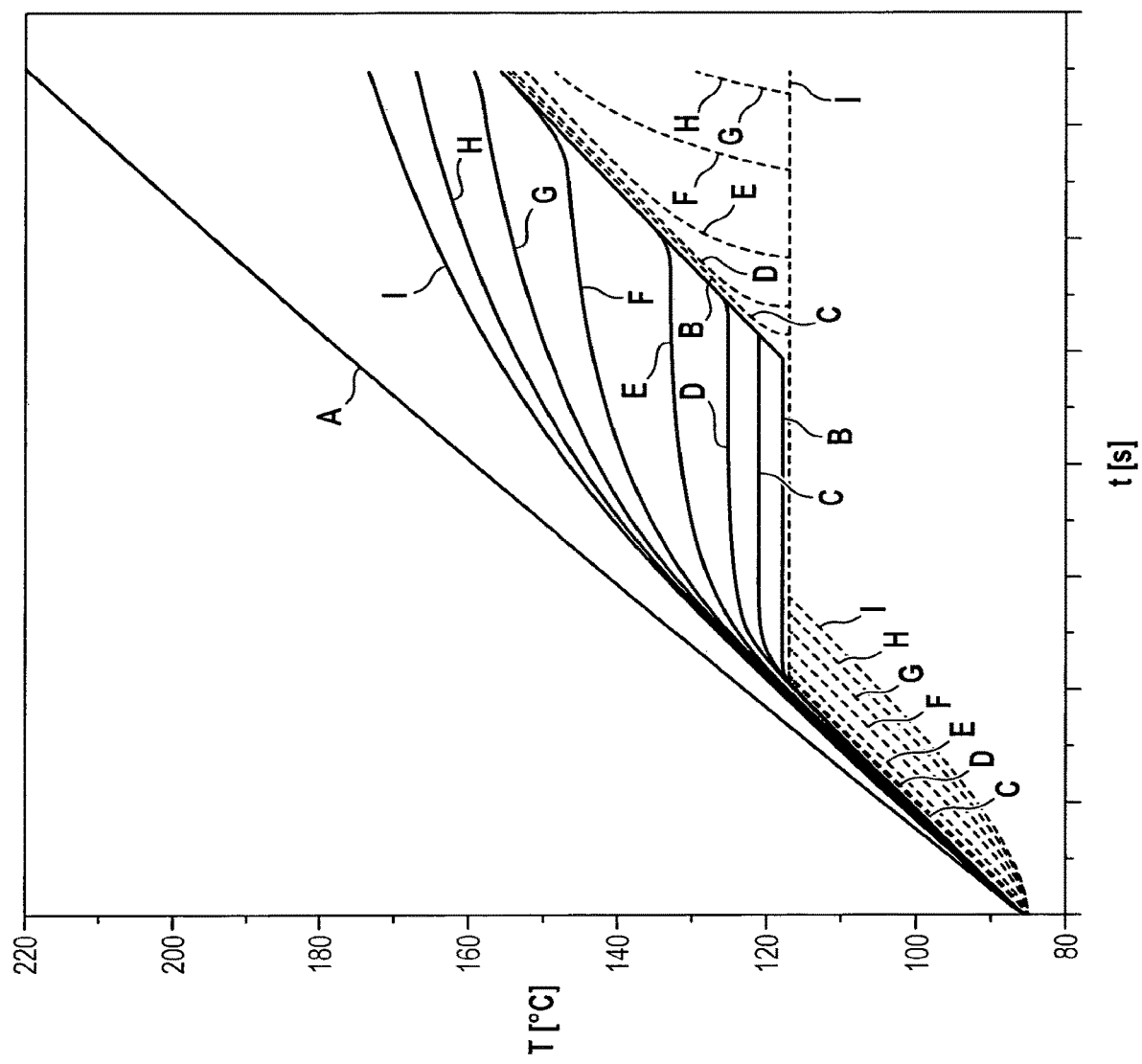
FIG. 6 illustrates curves of temperature rise within the notch of the stator containing the winding and the phase change material, as a function of the duration of the thermal stress (i.e., transient phases of the electric machine related to startup of the aircraft engine.

FIG. 6 illustrates the rise in temperature as a function of the duration:
the curve A corresponds to the rise in the temperature of the winding without heat sink;
the curves in dotted lines correspond to the rise in the temperature of the heat sink;
the curves in solid lines correspond to the rise in the temperature of the winding with heat sink.

The curve network corresponds to several thermal resistances named "Rth" in FIG. 6. This resistance represents the efficiency of the thermal transfers from one medium to another. The lower the value of Rth, the more the heat transfers take place efficiently. In FIG. 6, from A to C, the thermal resistance Rth increases.

It is observed that the temperature reached without a heat sink can be above 200° C., which results for example in the degradation of the insulator of the winding. By adding heat sinks and by taking into consideration an optimized thermal resistance between the heat sink and the support, the maximum temperature reached on the sensitive component remains below its limit temperature.

In a complementary manner, in addition to housing the heat sink that the phase change material represents, inside the bar winding, heat sinks can be disposed at other locations of the electric machine as described in the document FR 3 012 698 in the name of the Applicant.

An electric machine with a stator winding has been described here. Of course, the invention also applies to an electric machine with a rotor winding, that for example the electric machine called wound-rotor synchronous electric machine constitutes (i.e., in this case the permanent magnets are advantageously replaced by an electromagnet to generate the magnetic flux).

The invention also relates to a direct current or alternating current machine such as a starter-generator, an alternator, a pump comprising an electric machine as described above.

And the invention also relates to an engine of an aircraft, such as a helicopter, comprising an electric machine according to the invention.

The invention claimed is:

1. An electric machine comprising:
a stator and a rotor configured to be driven in rotation relative to each other, the rotor comprising a plurality of permanent magnets, the stator comprising a magnetic circuit comprising poles extending towards the rotor;
windings of conductive elements around each pole; and
at least one heat sink disposed inside a conductive element, the heat sink comprising a phase change material, wherein the phase change material of the heat sink is contained in a sealed metal shell.

2. The electric machine according to claim 1, wherein the winding is a set of hollow cylindrical wires.

3. The electric machine according to claim 1, wherein the winding is a hollow bar winding.

4. The electric machine according to claim 3, wherein the winding is formed in one piece.

5. The electric machine according to claim 4, wherein the winding is obtained according to an additive manufacturing method.

6. The electric machine according to claim 1, wherein the phase change material is capable of changing physical state between the solid state and the liquid state in a given temperature range.

7. The electric machine according to claim 1, wherein the phase change material is in a form of salts or in a form of organic or eutectic compounds having solid-liquid phase change temperatures, adapted according to constraints of use of the electric machine, between 100° C. and 300° C.

8. The electric machine according to claim 1, wherein the heat sink comprises, in addition to the phase change material, at least one element which is electrically conductive so as not to disturb circulation of magnetic field lines in said machine.

9. The electric machine according to claim 1, wherein the shell is electrically conductive or not, and thermally conductive.

10. A starter-generator comprising an electric machine according to claim 1.

11. An aircraft engine comprising a starter-generator according to claim 10.

12. An alternator comprising an electric machine according to claim 1.

13. A pump comprising an electric machine according to claim 1.

* * * * *